May 18, 1937.　　D. E. WALKER ET AL　　2,081,076
DISK BRAKE
Filed July 29, 1936
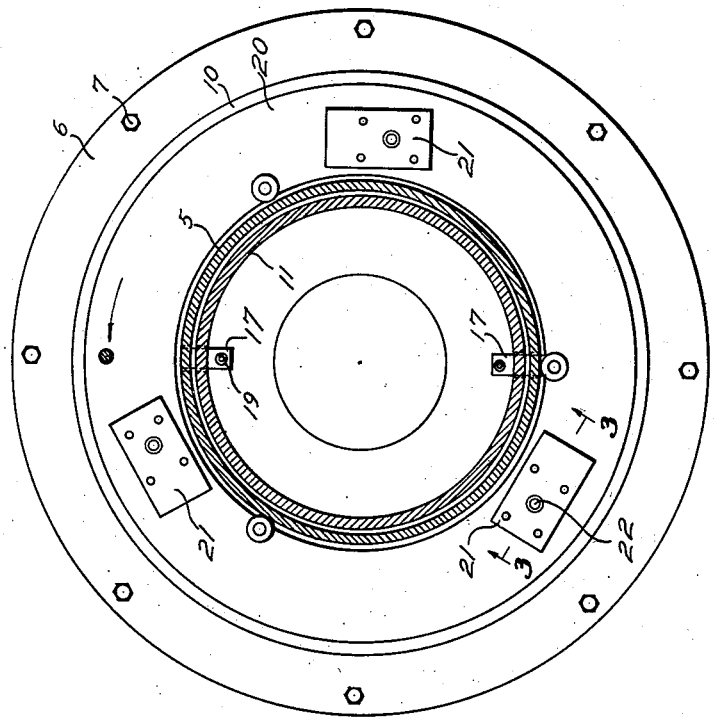
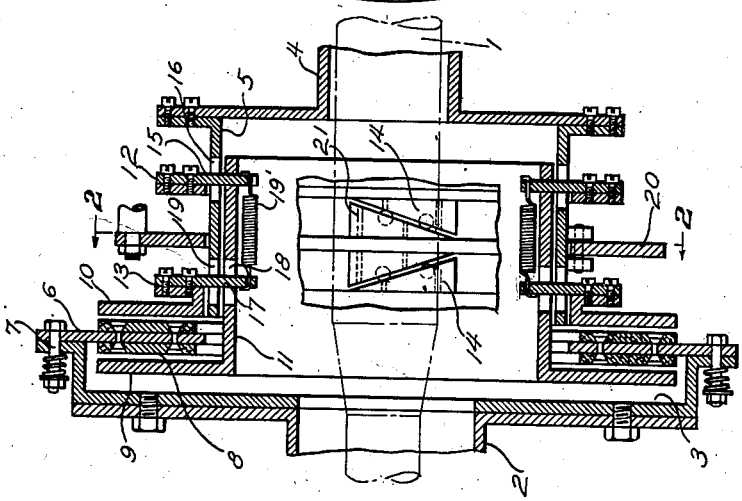
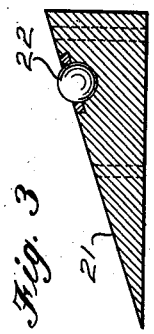
Donald E. Walker
Earle E. Wilbur
INVENTORS
BY Victor J. Evans & Co.
ATTORNEYS Patented May 18, 1937

2,081,076

UNITED STATES PATENT OFFICE 2,081,076

DISK BRAKE

Donald Earl Walker and Earle E. Wilbur, Buffalo, N. Y.

Application July 29, 1936, Serial No. 93,275

4 Claims. (Cl. 188—72)

This invention relates to brakes for motor vehicles or any other device wherein a brake may be employed and has for the primary object the provision of a simple and inexpensive device of this character which will be positive, smooth and quiet in operation and will be self-adjusting to compensate for wear and consists of a minimum number of parts and may be easily and quickly repaired when worn to an extent as to impair its efficiency.

With these and other objects in view, this invention consists in certain novel features of construction, combination and arrangement of parts to be hereinafter more fully described and claimed.

For a complete understanding of our invention, reference is to be had to the following description and accompanying drawing, in which Figure 1 is a fragmentary sectional view showing a brake constructed in accordance with our invention.

Figure 2 is a sectional view taken on the line 2—2 of Figure 1.

Figure 3 is a sectional view taken on the line 3—3 of Figure 2.

Referring in detail to the drawing, the numeral 1 indicates an axle on which is mounted a wheel hub 2 having secured thereto a brake drum 3. An axle housing 4 is provided for the axle 1 and has secured thereto a fixed supporting drum 5.

A brake drum disk 6 is secured to the brake drum 3 by bolts 7, the latter having springs thereon to permit the brake drum disk to yield towards and from the brake drum. A brake lining 8 is secured to opposite faces of the brake drum disk 6 and arranged to engage and disengage with the brake lining 8 are brake disks 9 and 10. The brake disk 9 is formed integrally with a sleeve 11 which is received in the supporting drum 5 and slides relative thereto. A wedge disk 12 is slidable on the supporting drum and a wedge disk 13 surrounds the supporting drum and is fixed to the brake disk 10. Wedges 14 are secured to the wedge disks 12 and 13 upon their opposing faces and the wedges of the disk 12 are arranged opposite to the wedges of the disk 13. Pins 15 are secured to the sleeve 11 and extend through slots 16 in the supporting drum 5 and are secured to the wedge disk 12. Pins 17 extend through slots 18 in the sleeve 11 and through slots 19 in the supporting drum and are secured to the wedge disk 13. The pins 15 and 17 are connected by coil springs 19'. The springs 19' act to normally disengage the brake disks from the brake lining 8 of the brake drum disk 6.

Journaled on the supporting drum is an operating disk 20 and the latter has connected thereto the brake operating medium. Pairs of wedges 21 are secured to the operating disk and arranged oppositely to the wedges 14 so that when the operating disk is rotated in one direction the wedges 21 act on the wedges 14 and force the brake disks 9 and 10 into engagement with the brake lining 8 of the brake drum 6 to retard the wheel forming a part of the hub 2. As soon as the wedges 21 are disengaged from the wedges 14, the springs 19' restore the brake disks 9 and 10 to non-brake applying position. Anti-friction rollers 22 are carried by the wedges to reduce friction between said wedges.

Having described the invention, we claim:

1. A brake comprising a fixed supporting drum, a brake drum disk secured to a brake drum, brake disks arranged to engage and disengage with the brake drum disk, a sleeve formed on one of the brake disks and slidably received by the supporting drum, wedge disks journaled on the supporting drum and one fixed to the other brake disk, wedges secured to the wedge disks, an operating disk journaled on the supporting drum, wedges secured to the operating disks and cooperating with the first-named wedges in moving the brake disks in engagement with the brake drum disk, and spring means acting to move the brake disks away from the brake drum disk.

2. A brake comprising a fixed supporting drum, a brake drum disk secured to a brake drum, brake disks arranged to engage and disengage with the brake drum disk, a sleeve formed on one of the brake disks and slidably received by the supporting drum, wedge disks journaled on the supporting drum and one fixed to the other brake disk, wedges secured to the wedge disks, an operating disk journaled on the supporting drum, wedges secured to the operating disks and cooperating with the first-named wedges in moving the brake disks in engagement with the brake drum disk, pins connecting one of the wedge disks to the sleeve and slidable through the supporting drum, pins secured to the other wedge disk and slidable through the supporting drum and sleeve, and springs connecting the first and second-named pins.

3. A brake comprising a fixed supporting drum, a brake drum disk secured to a brake drum, brake disks arranged to engage and disengage with the brake drum disk, a sleeve formed on one of the brake disks and slidably received by the supporting drum, wedge disks journaled on the supporting drum and one fixed to the other brake disk, wedges secured to the wedge disks, an operating disk journaled on the supporting drum, wedges secured to the operating disks and cooperating with the first-named wedges in moving the brake disks in engagement with the brake drum disk, pins connecting one of the wedge disks to the sleeve and slidable through the supporting drum, pins secured to the other wedge disk and slidable through the supporting drum and sleeve, springs connecting the first and second-named pins, and brake lining secured to opposite faces of the brake drum disk to be engaged by the brake disks.

4. A brake comprising a fixed supporting drum, a brake drum disk secured to a brake drum, brake disks arranged to engage and disengage with the brake drum disk, a sleeve formed on one of the brake disks and slidably received by the supporting drum, wedge disks journaled on the supporting drum and one fixed to the other brake disk, wedges secured to the wedge disks, an operating disk journaled on the supporting drum, wedges secured to the operating disks and cooperating with the first-named wedges in moving the brake disks in engagement with the brake drum disk, pins connecting one of the wedge disks to the sleeve and slidable through the supporting drum, pins secured to the other wedge disk and slidable through the supporting drum and sleeve, springs connecting the first and second-named pins, brake lining secured to opposite faces of the brake drum disk to be engaged by the brake disks, and anti-friction balls carried by the wedges.

EARLE E. WILBUR.
DONALD EARL WALKER.